March 28, 1961  C. L. CHAFER  2,976,643
MACHINE FOR SPRAYING POWDERED MATERIALS
Filed May 8, 1959  2 Sheets-Sheet 1

Inventor:
Charles Littlewood Chafer
by Robert Henderson
attorney

United States Patent Office 2,976,643
Patented Mar. 28, 1961

2,976,643
MACHINE FOR SPRAYING POWDERED MATERIALS

Charles Littlewood Chafer, Doncaster, England, assignor to J. W. Chafer Limited, Doncaster, England, a company of Great Britain and Northern Ireland Filed May 8, 1959, Ser. No. 811,986
Claims priority, application Great Britain May 20, 1958
9 Claims. (Cl. 43—148)

This invention relates to a machine for spraying powdered materials and is particularly suitable for use in agriculture and horticulture for spraying growing crops with insecticides and similar materials in the form of dust or in other finely powdered form.

An object of this invention is to provide a machine for spraying powdered materials comprising a hopper for containing a supply of the material to be sprayed, a suction duct alongside and exteriorly of the hopper, an agitating chamber between the duct and the hopper having an inlet communicating into the lower end of said hopper and an outlet communicating into the suction duct, means in the hopper for feeding the material therefrom into the agitating chamber, means for agitating the material in said agitating chamber, and means in the suction duct or at the end thereof for drawing the material from the agitating chamber and discharging it into the atmosphere.

It is a further object to provide that the means for feeding material from the hopper into the agitating chamber comprises an intermittently rotating worm conveyor operable interiorly of the hopper at the base thereof opposite the inlet to the agitating chamber, which inlet is provided in a side wall of the hopper and said worm conveyor extends for a short distance into the agitating chamber.

A still further object is to provide a hollow worm conveyor rotatably accommodated upon a rotary spindle extending therethrough and into the agitating chamber, said spindle being mounted at its opposite ends in bearings and being driven at high speed at its one end which extends exteriorly of the agitating chamber by any suitable driving means and being provided, at its other end, exteriorly of the hopper, with means co-operating with means on the shaft of the worm, also exteriorly of the hopper, for effecting intermittent rotation of the worm in the same direction as, or contrawise to, the spindle on continuous rotation of said spindle.

Still another object is to provide that the means for drawing material from the agitating chamber through the suction duct comprises a fan or blower disposed at or near the end of said duct and operable in a delivery chamber for discharging material therefrom into the atmosphere.

Yet another object is to provide the delivery chamber with two detachable tubular spraying arms extending in opposite directions and capable of being folded to an out of use position, each of said arms being provided with a plurality of discharge nozzles at intervals of its length, the inner ends of each tubular spraying arm being at diametrally opposite sides of the blower so that material is blown out through the discharge nozzles of both arms, whose outer ends are closed.

A typical embodiment of the invention will now be described with reference to the accompanying drawings, in which.

Figure 1:
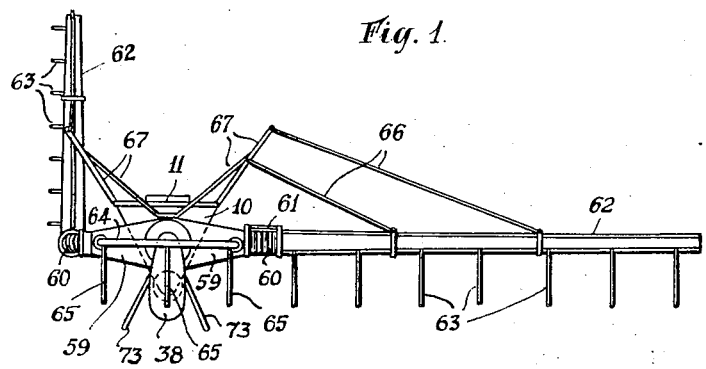
Fig. 1 is an elevation of one form of spraying machine according to this invention, for removable fitment to an agricultural tractor, one of the tubular spraying arms being shown in a raised and inoperative position.
Figure 2:
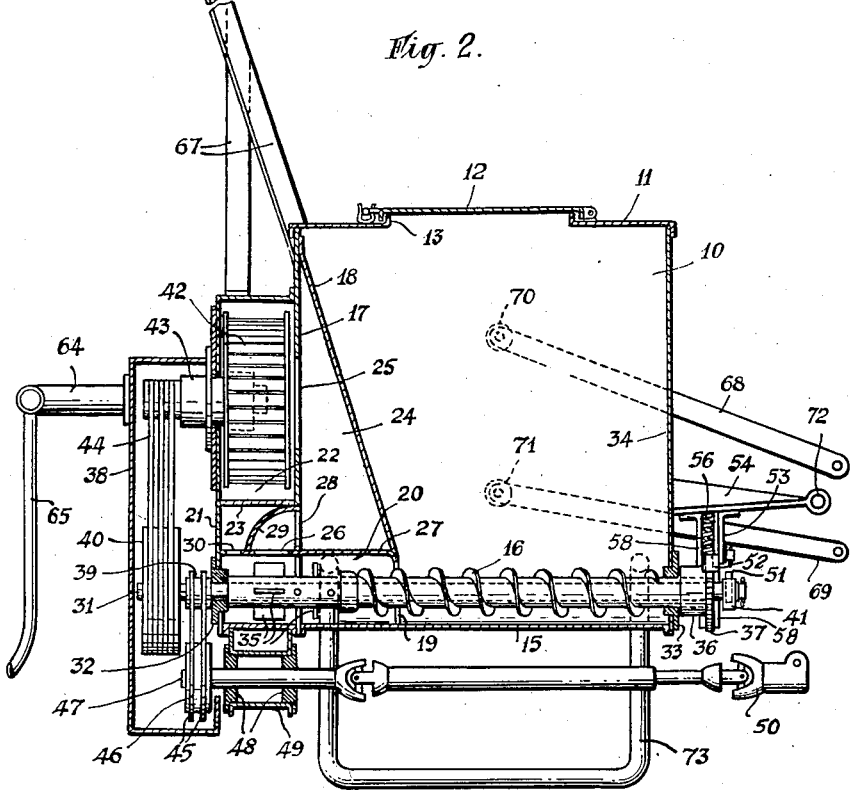
Fig. 2 is a sectional view taken on line 2—2 of Fig. 3.

In the drawings, 10 is a hopper for carrying a supply of the powdered material to be sprayed, said hopper having a covered-in top 11 with hinged lid 12 closing the feed opening 13 of the hopper. Two opposite side walls 14 of the hopper converge downwardly to form a rounded basal end 15 for accommodating a conveyor worm 16.

Sloping downwardly from the upper end of the vertical end wall 17 at the inside of the hopper 10 is a false wall 18, of which the lower end forms an orificed vertical dividing wall 19 separating the hopper 10 from a horizontal agitating chamber 20 extending outwardly beyond the hopper end wall 17 into the lower end of an external casing 21, of which the upper section forms an outlet or delivery chamber 22 closed from the agitating chamber 20 by a partition 23 but open to a suction duct 24 formed by the sloping false wall 18 and the adjacent end wall 17 proper of the hopper, said end wall 17 having an opening 25 leading into the delivery chamber 22.

The agitating chamber 20 is in communication with the suction duct 24 by an orifice 26 in the roof 27 of said chamber and an opening 28 in the hopper end wall 17, a deflecting baffle 29 being disposed over the orifice 26 and opposite the opening 28. An air inlet or vent opening 30 is provided in the roof 27 of the agitating chamber at the rear of the baffle 29 to avoid vacuum conditions prevailing.

The conveyor worm 16 is hollow and rotatably accommodated upon a rotary spindle 31, one end of which spindle is mounted in and extends through a bearing 32 in the wall of the casing 21 while the other end of said spindle is mounted, through the medium of the rotatable worm conveyor thereon, in a bearing 33 in the end wall 34 of the hopper 10.

The major length of the worm conveyor 16 which is located in the agitating chamber 20 is devoid of a helix and in lieu thereof is provided with radial arms or vanes 35 which act as agitators of powdered material as it is fed into the agitating chamber 20 from the bottom of the hopper 10 by the worm conveyor 16.

The other end of the worm conveyor 16 extends through the bearing 33 where it is provided with a flanged collar 36 of which the flange constitutes a ratchet wheel 37 adapted to be actuated for rotating the worm conveyor intermittently, as will be described later.

The spindle 31 extends beyond the agitating chamber 20 and into a gear casing 38 where it carries a chain driven sprocket 39 and a driving pulley 40, both of which are keyed to said spindle. At its other end, the spindle extends beyond the ratchet wheel 37 to carry a cam 41 forming part of the ratchet mechanism for actuating the ratchet wheel 37, as will be explained later.

Disposed in the delivery chamber 22 is a rotary multi-blade blower 42 which is operated by a stub shaft 43, suitably mounted in the wall of said delivery chamber and driven by belt drive 44 from the driving pulley 40 on the spindle 31 and the chain sprocket 39 on said spindle is driven by chains 45 from a driving sprocket 46 on a driving shaft 47 mounted in bearings 48 in a depending extension 49 of the agitating chamber 20, said driving shaft 47 being suitably coupled to a take-off drive shaft 50 on the engine of an agricultural tractor (not shown).

Figure 4:
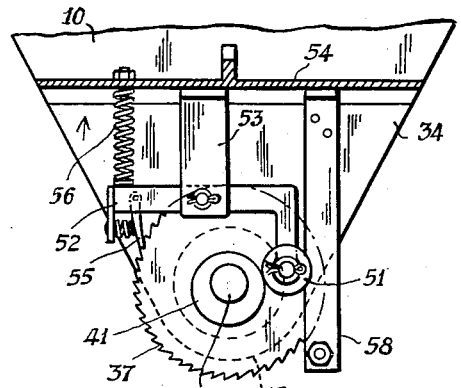
Fig. 4 is a fragmentary view partly in section drawn to a still larger scale showing the mechanism for intermittently operating the conveyor worm of the hopper.
Figure 5:
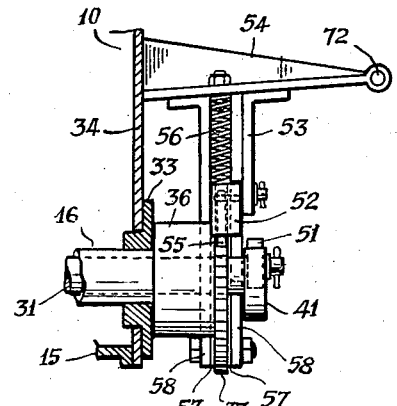
Fig. 5 is a side elevation partly in section of Fig. 4.

As will be seen in Figs. 4 and 5, the cam 41 on the spindle 31 makes peripheral engagement with a roller 51 carried on the depending end of a lever 52 pivotally carried intermediate of its ends by an angled bracket 53 from an overhead carrier bracket 54 secured exteriorly to the end wall 34 of the hopper 10. The end of the pivoted lever 52 remote from the roller 51 carries a dependant pawl 55 which is spring urged in engagement with the teeth of the ratchet wheel 37, the pawl-carrying end of the lever 52 being upwardly urged by a tension spring 56, connected to the carrier bracket 54, in order to maintain engagement of the roller 51 with the cam 41, the arrangement being such that on rotation of the spindle 31, the cam oscillates the lever 52 about its pivot whereby the pawl-carrying end thereof causes the pawl 55 to move the ratchet wheel one tooth at a time for each revolution of the spindle 31 and in the same direction and thereby effect intermittent rotation of the conveyor worm 16 since the ratchet wheel is drivingly connected therewith. If, therefore, the ratchet wheel is provided with eighty teeth, the ratchet wheel and consequently the worm, will rotate once for eighty revolutions of the spindle.

To ensure this tooth-by-tooth rotation of the ratchet wheel, said wheel is frictionally restrained by engagement with the radial faces thereof of two opposing friction strips 57 carried by a pair of depending brackets 58 secured to the carrier bracket 54.

Figure 3:
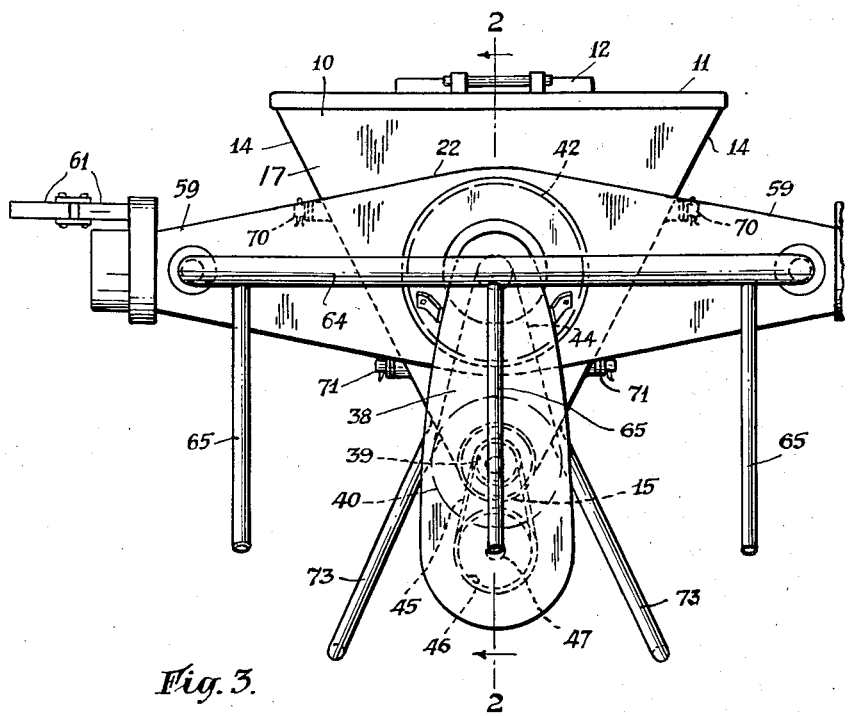
Fig. 3 is an enlarged elevation of the hopper and spraying unit with the tubular spraying arms omitted.

As will be seen in Figs. 1 and 3, the delivery chamber 22 is extended horizontally at diametrally opposite points thereof substantially in parallel with and alongside the adjacent end wall 17 of the hopper 10 to provide two co-axial tubular extensions tapering into circular discharge ends 59 to which are connected by flexible coupling sleeves 60 (Fig. 1) and hingedly connected anchoring brackets 61 (Fig. 3), two tubular arms 62 having, at regular intervals of their length, depending spraying nozzles 63. A short length of tube 64 connects the interior of the two ends of the delivery chamber 22 which tube also carries a plurality of depending spraying nozzles 65 so that the full complement of nozzles 63 and 65 are evenly spaced apart throughout the tubular spraying arms 62 and the tube 64.

The tubular spraying arms 62 are supported by wire ropes 66 from overhead stays 67 secured to the hopper and owing to the flexible coupling sleeves 60 and hinged securing links 61, said spraying arms can be swung upwardly and forwardly to and suitably secured in an out of use position, as shown at the lefthand end of Fig. 1, so that the spraying machine, when fitted on an agricultural tractor (not shown), can be conveniently transported by said tractor from one place to another.

For securing the machine upon a tractor, links 68 and 69 pivotally connected at 70 and 71 to the hopper 10 at opposite sides thereof are adapted to be connected at their other ends to the tractor at suitable points thereon. The carrier bracket 54 is provided with an eye end 72 also for connection to the tractor.

For supporting the machine when disconnected from the tractor, the hopper is provided with legs 73 by which the machine can rest upon the ground.

In operation, the machine, as shown in the drawings, is traversed by the tractor on which it is mounted along a field for spraying a crop of young plants, corn or the like so that the depending spraying nozzles 63 and 65 can discharge powdered insecticide upon the foliage at a low height from the ground, said material which is contained in the hopper being fed therefrom by the worm conveyor 16 on intermittent rotation thereof by the pawl and ratchet wheel mechanism 37 and 55 as a result of continuous rotation of the spindle 31 driven by the driving shaft 47 from the engine of the tractor (not shown).

As the powdered material is fed by the worm conveyor into the agitating chamber 20 and agitated by the vanes 35 on the extended length of said worm conveyor which operates in said agitating chamber, said material is drawn up through the suction duct 24 into the delivery chamber 22 by the blower 42 which is rotationally driven from the spindle 31 and blown out from said delivery chamber in opposite directions into the spraying arms 62, the tube 64 and out through the spraying nozzles 63 and 65 into the atmosphere and on to or in close proximity to the growing crop.

If desired, the intermittent rotation of the worm conveyor 16 effected through the cam actuated pawl and ratchet mechanism from the spindle 31 may be in a direction contrawise to that of the spindle, in which case, the friction between said spindle and worm may be sufficient to ensure tooth-by-tooth movement of the ratchet wheel 37 by the pawl 55 without the necessity for the friction strips 57 and brackets 58 therefor.

What I claim is:

1. A machine for spraying powdered materials comprising, a hopper for containing the material to be sprayed, a suction duct alongside and exteriorly of the hopper, an agitating chamber between the hopper and the suction duct and communicating with the outlet of said hopper and with the inlet of said suction duct, a delivery chamber communicating with the suction duct and having an outlet opening, a rotary spindle extending through the agitating chamber and the hopper at the base of said hopper, a tubular feed worm rotatably mounted on the spindle and extending part way into the agitating chamber through the inlet end thereof, agitating members fixed to the length of spindle within the agitating chamber, co-operating means on said spindle and said feed worm exteriorly of the hopper and remote from the agitating chamber for intermittently rotating the worm on continuous rotation of the spindle, means in the delivery chamber comprising a multi-blade blower for creating a suction in the suction duct and a forced draught through said delivery chamber, a spraying arm fitted to the outlet opening of the delivery chamber, power driven means for operating the spindle remote from the feed worm and transmission means on the spindle for operating the means for creating a suction in the suction duct and a forced draught in the delivery chamber.

2. A machine for spraying powdered materials comprising a hopper for containing the material to be sprayed, a suction duct alongside and exteriorly of the hopper, an agitating chamber between the hopper and the suction duct and communicating with the outlet of said hopper and with the inlet of said suction duct, a delivery chamber communicating with the suction duct, a rotary spindle extending through the agitating chamber and the hopper at the base of said hopper, a tubular feed worm rotatably mounted on the spindle and extending part way into the agitating chamber through the inlet end thereof, agitating members fixed to the length of spindle within the agitating chamber, co-operating means on said spindle and said feed worm exteriorly of the hopper and remote from the agitating chamber for intermittently rotating the worm on continuous rotation of the spindle, means in the delivery chamber comprising a multi-blade blower for creating a suction in the suction duct and a forced draught through said delivery chamber, power driven means for operating the spindle remote from the feed worm and transmission means on the spindle for operating the means for creating a suction in the suction duct and a forced draught in the delivery chamber and a spraying arm in communication with said delivery chamber and having a discharge nozzle.

3. A machine for spraying powdered materials comprising a hopper for containing the material to be sprayed, a suction duct alongside and exteriorly of the hopper, an agitating chamber between the hopper and the suction duct and communicating with the outlet of said hopper and with the inlet of said suction duct, a delivery chamber communicating with the outlet of the suction duct, a rotary spindle extending through the agitating chamber and the hopper at the base of said hopper, a tubular feed worm rotatably mounted on the spindle and extending part way into the agitating chamber through the inlet end thereof, agitating members fixed to the length of spindle within the agitating chamber, co-operating means on said spindle and said feed worm exteriorly of the hopper and remote from the agitating chamber for intermittently rotating the worm on continuous rotation of the spindle, means in the delivery chamber comprising a multi-blade blower for creating a suction in the suction duct and a forced draught through said delivery chamber, power driven means for operating the spindle remote from the feed worm and transmission means on the spindle for operating the means for creating a suction in the suction duct and a forced draught in the delivery chamber and a pair of oppositely directed spraying arms connected to and communicating with said delivery chamber, each said spraying arm carrying a plurality of discharge nozzles.

4. A machine for spraying powdered materials as claimed in claim 3, characterised in that the spraying arms are connected to the delivery chamber by flexible coupling means permitting said arms to be folded to an out of use position.

5. A machine for spraying powdered materials as claimed in claim 3, characterised in that the co-operating means on the rotary spindle and feed worm comprises a ratchet wheel on the shaft of the feed worm, a pawl engageable with said ratchet wheel, a cam-operated lever actuated by the spindle and mounted on the hopper and carrying and oscillating said pawl into engagement with and disengagement from the ratchet wheel whereby the ratchet wheel and consequently the feed worm rotationally move a distance equivalent to the pitch of the teeth of the ratchet wheel for one complete revolution of the spindle.

6. A machine for spraying powdered materials as claimed in claim 5, characterised in that the feed worm is rotated contrawise to the direction of rotation of the rotary spindle.

7. A machine for spraying powdered materials as claimed in claim 5, characterised in that the feed worm is rotated in the same direction as the rotary spindle, means being provided for frictionally restraining the rotation of the ratchet wheel.

8. A machine for spraying powdered materials comprising, a hopper for containing the material to be sprayed, a delivery chamber externally of the hopper having an inlet and a discharge outlet, an agitating chamber between said delivery chamber and the hopper, a suction duct communicating an outlet of the agitating chamber with the inlet of the delivery chamber, an intermittently rotatable tubular feed worm in the hopper having one end traversing the outlet of said hopper and an inlet of the agitating chamber, a continuously rotatable driven spindle supportingly traversing the tubular worm, said spindle also traversing the agitating chamber and having one end projecting exposedly therebeyond and the other end projecting exposedly beyond the hopper, material-agitating means on said spindle operable within the agitating chamber, means rotatably mounted in the delivery chamber for creating a suction in the suction duct and a forced draught through said delivery chamber, means on the driven spindle externally of and adjacent the agitating chamber in driving connection with the blower, said suction and forced draught creating means, and means on said spindle remote from said agitating chamber and externally of the hopper co-operating with means on said hopper for effecting intermittent rotation of the feed worm on rotation of the spindle.

9. A machine for spraying powdered materials comprising, a hopper for containing the material to be sprayed, a casing attached externally to and alongside the hopper, a delivery chamber in an upper section of the casing and an agitating chamber in a lower section of said casing, said agitating chamber communicating with the outlet of the hopper, a suction duct communicating the delivery chamber with the agitating chamber, said suction duct having a vent opening for admitting air thereto, a tubular feed worm in the hopper at the base thereof and traversing the outlet of said hopper, an extension at one end of the feed worm extending into the agitating chamber and constituting a tubular shaft rotatable in unison with said worm, material-agitating means on said tubular shaft operable in said agitating chamber, a rotary driven spindle traversing the tubular feed worm and the tubular shaft to project by one end from the agitating chamber remotely from the hopper and projecting by the other end from said hopper remotely from said agitating chamber, said spindle being rotatable relatively to said feed worm, a blower rotatably mounted in the delivery chamber for creating a suction in the suction duct and a forced draught through said delivery chamber, means on said one projecting end of the spindle for transmitting drive from said spindle to the blower, a ratchet wheel on said other projecting end of the spindle, a cam-operated oscillatable lever mounted on the hopper in actuable engagement with the spindle, and a pawl carried by said oscillatable lever for engagement with and disengagement from the ratchet wheel so as to rotate the ratchet wheel a distance substantially equal to the pitch of the teeth of the ratchet wheel for one complete revolution of the spindle.

References Cited in the file of this patent
UNITED STATES PATENTS
707,992   Warner _____ Aug. 26, 1902